United States Patent [19]

Kuris

[11] 4,126,547
[45] Nov. 21, 1978

[54] ULTRASONIC OIL SPILL REMOVAL

[76] Inventor: Arthur Kuris, 3725 Henry Hudson Pkwy., Riverdale, N.Y. 10463

[21] Appl. No.: 748,187

[22] Filed: Dec. 7, 1976

[51] Int. Cl.$^2$ .............................................. C02B 9/02
[52] U.S. Cl. ..................................... 210/19; 210/122; 210/198 R; 210/242 R; 210/DIG. 22; 210/DIG. 26
[58] Field of Search ............... 210/19, 65, 152, 242 R, 210/242 A, 242 AS, 242 S, DIG. 22, DIG. 25, DIG. 26, DIG. 27, 97, 104, 122, 198 R, 199, 206; 259/DIG. 44

[56] References Cited

U.S. PATENT DOCUMENTS

| 3,625,857 | 12/1971 | Weimer | 210/DIG. 27 |
| 3,700,937 | 10/1972 | Rissolo | 259/DIG. 44 |
| 4,032,438 | 6/1977 | Koblanski | 210/19 |

Primary Examiner—Thomas G. Wyse
Assistant Examiner—Ivars Cintins
Attorney, Agent, or Firm—Leonard W. Suroff

[57] ABSTRACT

Oil slicks on surface waters are dispersed by the exposure of the surface oils to ultrasonic energy to effectuate an homogenization of the oil and water to permit absorption of the oil within the total volume of water.

40 Claims, 2 Drawing Figures

ULTRASONIC OIL SPILL REMOVAL

BACKGROUND OF THE INVENTION

1. Field of the Invention

The present invention relates to the removal of oil pollution from surface waters and more particularly the invention relates to the method and equipment for the clean-up of oil slicks on surface waters.

2. Description of the Prior Art

The frequency and danger of oil spills has greatly increased in the past several years due to the use of supertankers and the off-shore drilling in geologically active areas. Oil spill disasters have been experienced in the last several years due to these activities.

The techniques available for controlling and removing the slick from surface waters are unsatisfactory. Dispersants and detergents are effective in eliminating much of the slick but are feared because of the unknown effect on the ecological balance. Various absorbent materials have proposed to be applied to the slick to sink the oil to the bottom of the ocean. Again, this may drastically upset the ecological balance.

Another technique utilizes a treated silica which will act as a wick and permit burning of the slick. This is not effective in many circumstances and is dangerous, especially in the presence of a natural gas leak. For these reasons, the slicks have been mainly controlled by very primitive methods such as by skimming with pumps and by coagulating the oil with straw which is then removed and burned.

The containment, removal, and cleanup of spilled oil are among the most difficult and most misunderstood problems in ocean engineering. The present difficulties are both technological (because physical and chemical understanding of some of the phenomena is incomplete) and sociological (because many untrained people wrongly believe that the problem is simple enough to be solved in short order with present-day technology). Except in a few highly specialized areas-offshore oil well drilling among them-business and government have devoted far less capital expenditure to ocean engineering than to other fields in the sense that many potential areas for technological development have not been pursued to the extend possible. The containment, removal, and cleanup of spilled oil is one such area. The application of modern technology to this problem did not begin on any large scale until the aftermath of the Torrey Canyon disaster in 1967.

There are many reasons why oil spill cleanup problems are so difficult. There is a lack of understanding of the physics and chemistry underlying some of the pollution control difficulties. Some oil slicks cover tens of square miles. Currents and waves generate enormous forces on equipment. The logistics of dealing with something so large and so mobile in the face of the large forces of the sea are staggering. The area of the earth susceptible to an oil spill is large, and spills occur at random.

A number of materials have been used to remove or reduce oil slicks. Treating agents have been used to deal with accidents and field and laboratory experiments have been done to assess their usefulness and to develop the technology to use them. The types of agents which have been used to date are:

1. Dispersants — chemicals forming oil-in-water suspensions;
2. Sinking agents — materials that mix with the oil and create a mixture dense enough to sink;
3. Burning agents — material put on the slick to assist ignition or enhance combustion of spilled oil;
4. Biodegradants — substances that promote oxidation of oil by microbial action;
5. Gelling agents — chemicals that form semi-solid oil agglomerates to facilitate removal;
6. Herding agents — chemicals that concentrate the spilled oil in a small area;
7. Sorbents — materials that absorb or adsorb oil to form a floating mass for later collection and removal.

Dispersants are chemical compounds that act to enhance the surface spreading of oil slicks and to emulsify the oil into the water beneath it. These effects increase the surface area of the slick so that more of it is susceptible to biodegradation. When emulsification (breaking the oil into very small droplets that become mixed with the water) occurs, the slick disperses vertically as well as horizontally. Toxicity of dispersed slicks is a major problem and is due both to the effect of the dispersant and to the increased oil surface to which marine organisms are exposed.

The use of chemical dispersants presents two major problems. The first is to obtain adequate mixing between the dispersant and the oil slick; and the second is to minimize toxicity to marine life. The mixing difficulty was demonstrated in the Santa Barbara accident, where it was found that after the dispersant was spread in a fine mist over the oil slick, it was necessary to run work boats through the slick so that their propeller action would mix the dispersant with the oil. Work is currently underway on the development of dispersants that will require little or no mixing. However, the question of toxicity remains. Some dispersants are more toxic to marine life than others, and the differences may relate in part to varying quantities of oil surface to which organisms are exposed. As oil slicks are dispersed into droplets, the surface area multiplies.

A less serious problem with dispersants involves the stability of the oil-water emulsion they generate. Experiments have shown that with some dispersants the lifetime of this emulsion can be relatively short, and the dispersed oil soon recombines into a slick. However, the stability of the emulsion generated by other dispersants is quite long, and a number of companies are doing work on increasing the emulsion stability.

Dispersants have been found effective when it is advantageous to disperse small parts of an oil slick. For example, dispersants were used and found effective to remove slicks in the vicinity of the burning oil platform at the Chevron Oil spill. However, it would have been impossible, even if allowed by law, to completely disperse all the polluting oil from this incident. If dispersants requiring no mixing are developed in the future, it may become possible to disperse an entire slick of moderate size.

OBJECTS OF THE INVENTION

An object of the present invention is to provide an improved system and method for removal of oil slicks under a variety of environmental conditions.

Another object of the present invention is to provide an improved method for absorbing the oil slick in the surrounding body of water.

Another object of the present invention is to provide a system which includes means for generating ultrasonic mechanical variations capable of fracturing the oil into particles that are absorbed in the surrounding body of water.

Other objects of the present invention will become apparent as the disclosure proceeds.

SUMMARY OF THE INVENTION

Oil slicks are dispersed according to the invention by applying ultrasonic energy in a manner to produce periodic perturbations of large displacement amplitude in the fluid medium. The ultrasonic energy may be applied in conjunction with chemicals to further aid in the absorption of the oil into the large body of water associated therewith.

Generally speaking in accordance with the invention, a device for homogenization of the oil into the body of water is obtained using an output radiator or ultrasonic motor for generating longitudinal vibrations of large displacement amplitude adapted to produce periodic perturbations in the oil, and reflecting means disposable in facing relation to the generating means output radiator. The oil to be dispersed is funneled through the gap between the ultrasonic motor and reflecting means for reflecting the vibrations back into the fluid medium consisting of the oil layer and water. The reflecting surface is spaced from the generating means output surface a distance such that the reflected vibrations are substantially in phase with the vibrations radiated into the fluid medium by the output radiator. In this manner, the displacement amplitude of the fluid medium perturbations are increased for the release of said oil particles into said fluid primarily by the selective entrainment characteristics of the viscous forces generated by said perturbating medium.

A method for cleaning the oil slick is also provided wherein the oil slick is carried through a fluid medium; longitudinal vibrations of large displacement amplitude are applied to said fluid medium from one side of the oil slick; and the vibrations are reflected at or somewhat beyond the other side of the oil slick back into said fluid medium, said reflected vibrations being substantially in phase with the applied longitudinal vibrations thereby substantially increasing the displacement amplitude of the fliud medium perturbations, the frequency of said vibrations and the viscosity of said fluid being coordinately selected for the release of particles from the oil slick into the fluid primarily by the selective entrainment characteristics of the viscous forces generated by said perturbating medium.

The generating means may include ultrasonic transducer means for the vibration of the generating means output radiator in a longitudinal, torsional, elliptical, and radial direction along an axis extending between said output radiator and said reflecting means. The fluid medium may include a chemical solvent said generating means being disposed so that the output radiator thereof lies in said fluid medium.

Where the fluid medium includes the oil slick, the generating means output radiator and reflector may be disposed in a liquid bath with the oil slick being carried therebetween; or means may be provided for depositiong a layer of oil in advance of its passing between said generating and reflecting means so that the output radiator, liquid, and reflector are contiguous, said deposited oil slick and the particles released therefrom being substantially removed from the spacing after the passage thereof between said generating and reflecting means. The means for removing the dispersed oil particles may include vacuum means for suctioning off the liquid and particles or a fluid sluce means for directing a stream of fluid tangentially across the surface of the reflecting means, or directly through a permeable screen, to drive the fluid medium and particles entrained therein into the body of water.

BRIEF DESCRIPTION OF THE DRAWINGS

Although the characteristic features of this invention will be particularly pointed out in the claims, the invention itself, and in the manner in which it may be made and used, may be better understood by referring to the following description taken in connection with the accompanying drawings forming a part hereof, wherein like reference numerals refer to like parts throughout the several views and in which:

DESCRIPTION OF THE PREFERRED EMBODIMENT

Figure 1:
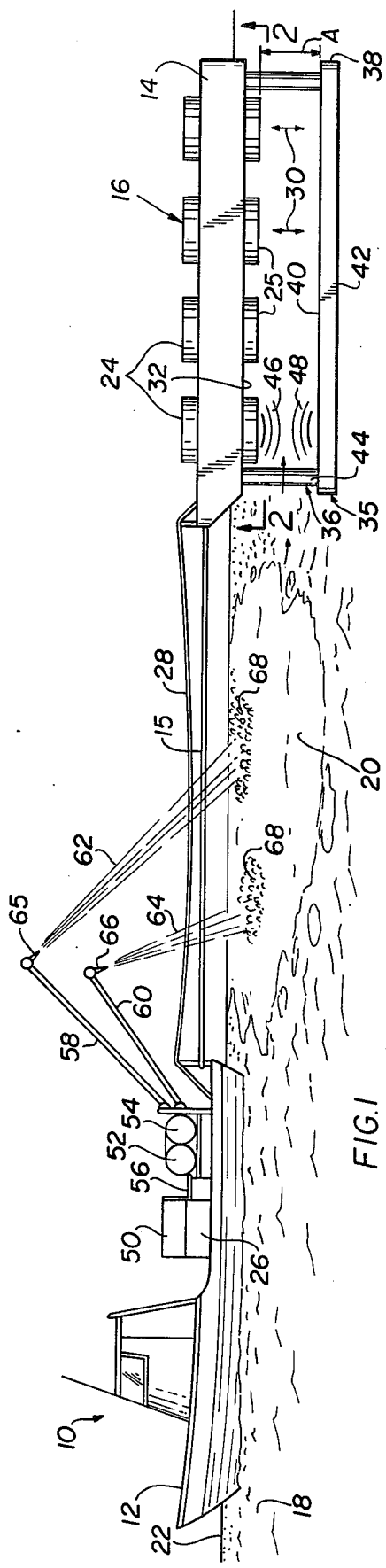
FIG. 1 is a schematic view of a system in accordance with the invention for controlling oil spills.

Referring now to FIG. 1 an oil slick control system 10 which generally includes a vehicle such as a ship 12 and a second vessel 14 which is illustrated in tow by connecting means 15 extending therebetween. The second vessel 14 which may be in the form of a barge contains the ultrasonic means 16 for generating mechanical vibrations for transmission in the body of water 18 having the oil slick 20 contained on the surface 22 of the water 18. The ultrasonic means 16 for creating the elastic waves of a compressional nature are produced by one or more motors or transducers 24 having an exposed output end or radiator surface 25, which are energized by at least one oscillation generator means 26 with a power cable 28 connecting the two together. The oscillation generator means 26 shown schematically may be located on the ship 12 or the vessel 14.

The method and apparatus of the invention is obtained by providing a system adapted to be vibrated at an ultrasonic rate, with the term "ultrasonic" defined to include vibrations in the range of 1,000 to 1,000,000 cycles per second.

In accordance with the present invention, the oil deposits 20 are removed from the surface 22 by applying thereto high frequency mechanical vibrations. The effect of such vibrations is to disintegrate the oil deposits 20, such that a rapid fatigue failure of fracture of the oil 20 is obtained. The vibrations necessary to achieve the foregoing have a high frequency within the range between 1,000 and 1,000,000 cycles per second, and preferably of at least 10,000 cycles per second, and an amplitude within the range of 0.0001 inch so as to provide high peak accelerations, preferably of the order of at least 1,000g. Peak acceleration is equal to $4\pi^2 A/t^2$ in which A is the amplitude and $t$ is 1/frequency. Thus, for example, with a frequency of 20,000 cycles per second and an amplitude of 0.002 inch, a peak acceleration of approximately 100,000g is obtained. With "g" being the symbol representing gravitational acceleration.

The power energy level for driving all the motors 24 is generally in the order of from 1,000 to 100,000 watts depending on the size of the motors, ect. The generator means 26 may also be of the type having a built in frequency modulator which continuously varies the frequency over a preselected frequency range. Electrical generator 26 is adapted to produce a signal of predetermined frequency which is applied along leads in power cable 28 as the excitation for said transducer. The excitation may either have a conventional sinusodial waveform or may have other waveform configurations such as sawtooth or squarewave.

Figure 2:
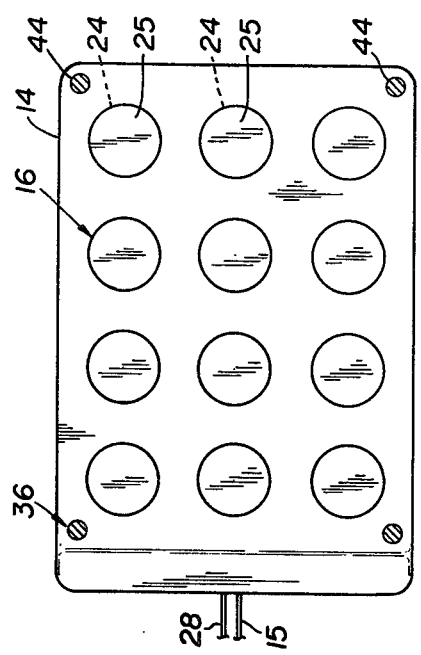
FIG. 2 is a partial top view of a portion of the system illustrated in FIG. 1, taken along lines 2—2 of FIG. 1.

The ultrasonic motor 24 may be one of a variety of electromechanical types, such as electrodynamic, piezoelectric and magnetostrictive, with the use of output sections that are readily replaceable when cavitational erosion of the output surface 25 occurs. A transducer as shown in FIG. 2 is utilized to initiate the generation of the high frequency field. Said transducer is of the electro-acoustic type of adapted to convert electrical energy into mechanical vibrations; a type frequently referred to in the art as ultrasonic transducers. While in the configuration of FIG. 2 a magnetostrictive transducer 24 is shown by way of example, like fields can also be produced by other electro-acoustic transducer such as electrostrictive and piezoelectric transducers which are equally applicable to the arrangement according to the invention. All of these transducers have in common the ability to produce longitudinal vibrations of a fixed preselected fundamental frequency.

The ultrasonic motor 24 is longitudinally dimensioned so as to have lengths which are whole multiples of half-wave lengths of the compressional waves established therein so that longitudinal loops of motion as indicated by arrow 30, occur at the output end 25 of the motor 24. In the embodiment of FIG. 2 transducer 24 may be of any desired design capable of achieving the functions of transmitting the vibrations generated to output radiator 25 amplifying said vibrations and efficiently coupling them to the liquid medium. The components of the motor 24 are essentially plain homogeneous metal bodies whose characteristics as vibration amplifiers are defined by the geometry of their design, the magnification produced being a function of their input and output surface areas, and their geometric profile along the vibration propagation axis. Said axis is perpendicular to the plane of the surface defining output radiator 25. Along said axis, the coupling elements are each mechanically resonant at the fundamental vibration frequency of the transducer 24.

Multiple stage amplification can be utilized if desired to increase the potential gain of the device. However, each successive stage added to the device markedly reduces its transmission efficiency. Dissipation of the vibrational energy into the surrounding structure such as an inner housing, is avoided by mounting means of an isolator type known in the art, or at a vibration nodal plane, in a conventional manner.

The surface defining output radiator 25 is plane and perpendicular to the vibration propagation axis. The shape thereof can take any number of geometric forms; however, in the embodiment shown in the drawings, a plane circular output surface is shown. Accordingly, the output end 25 of each motor 24 may be circular in configuration of a few inches to in excess of one foot in diameter of some other shape. The number of motors illustrated is merely to indicated the positionment relative to the vessel 14 and the fact that the output end 25 may be below the oil slick 20, slightly above the oil slick 20 to form a cavity, or substantially level with the water slick 20. In similar fashion the bottom 32 of the vessel 14, may extend above, level, or below the water surface 22. In relation to the output surfaces 25 the bottom 32 may extend in a plane above, below or level therewith. Further, the relationship may vary in progression from either end of the vessel relative to the reflecting means 35 mounted in fixed spaced relation by mounting means 36 to the vessel 14. As seen in FIG. 1 the plate 38 forming the reflecting means 35 may have an upper planar surface 40 and spaced apart lower surface 42 mounted in substantially parallel spaced relation to the bottom 32 of vessel 14 by posts 44 forming the mounting means 36. The number of posts 44 will vary in accordance with size or area being supported. The thickness of the plate 36 may vary from below one inch to several inches and may be made of sections.

It is also appreciated that a single vessel, which may be the boat 12, may have the transducers 24 mounted thereon in energy transferring relation to the oil slick 20 with the reflecting means 35 mounted therebelow. The advantage of a separate vessel 14 containing the ultrasonic equipment 16 is that more than one vessel 14 may be towed at one time to cover a large surface area. The spacing defined by dimension A between the reflecting means 35 and the radiator surface 25 may vary in distance from one quarter of an inch to one foot and may be in multiples of the length of a standing wave generated by the motors 24 in the body of water 18. The elastic energy waves 46 eminate from the radiator surface 25 and through the elastic medium comprised of the oil 20 and water 18 and is then reflected from the surface 40 in the form of returning energy waves 48.

Reflector 35 is adapted to reflect the high frequency field emanating from output radiator 25 back into the fluid medium. By properly positioning the principal surface 38 of reflector 35 relative to output radiator 25 reflector 35 serves to magnify the amplitude of the periodic perturbations of the fluid medium. Principal surface 38 of reflector 35 is a smooth flat plane surface oriented substantially perpendicular to the vibration propagation axis and parallel to output radiator 25. Said reflector is positioned so that the primary beam of vibrational energy radiated from output radiator 25, or the output radiator of any other embodiment of the high frequency field generating device according to the invention, impinges on the principal reflecting surface thereof. The surface area of principal surface 38 should preferably be large enough to intercept all of this energy. In order to achieve magnification of the periodic perturbations within the liquid medium, reflector 35 is designed and positioned such that the wavefronts reflected from the principal surface 38 of the reflector constitute a secondary source of vibrations which interfere with and have displacement amplitudes that are essentially in phase with the vibrations emanating from output radiator 25. Reinforcement of the vibrations in the fluid medium is developed by this in-phase superposition of the principal and reflected vibration wavefronts, thereby increasing the displacement amplitude of the fluid perturbations. The reflector according to the invention produces amplification of the medium perturbations without requiring any additional energy to be supplied to the system from an outside source.

This amplification is dependent solely on specific mechanical properties of the reflector and its spatial orientation in the system. Preferably a plate of uniform thickness having a smooth flat principal surface 38 oriented substantially perpendicular to the vibration propagation axis, reflector 35 is located with the fluid medium interposed between its principal reflecting surface 38 and the output radiator 25 of the generating device 24. Two requisites exist in order to generate a field in a fluid medium wherein the incident and reflected vibration displacements are essentially in phase. Firstly, the phase of the vibrations normally incident to the reflector must undergo phase inversion at the fluid/reflector interface when reflected from said reflector principal surface. This phase inversion is produced where the material of said reflector has a characteristic impedance larger than the characteristic impedance of the fluid medium. Said phase inversion in conjunction with the second requisite permits the production of stationary waves or a high standing wave ratio in the fluid 18. The second requisite is the spacing between the reflector surface 38 and output radiator 25. In order to produce the stationary or high standing wave ratio field, such spacing must be approximately equal to $n$ multiple half wave lengths of the vibration in the fluid where $n$ is zero or any integer. For the narrow gap condition (zero half wave lengths plus a small increment), the relative position of the oil slick 20 contained between the reflector and output radiator is not cricical, as where said spacing is less than one twentieth of a wave length. However, where $n$ is an integer, the oil slick 20 should be situated in the region of a vibration displacement antinode for maximum process efficacy.

Two other factors influence the efficiency of reflector 35. The first of these is the magnitude of the mismatch between the characteristic impedance of the fluid 18 and the reflector. Increasing this mismatch increases the magnitude of the fluid perturbations by maximizing the percentage of the vibrational energy reflected back into the fluid medium 18. The second factor is the thickness of the reflector 35 in the direction parallel to the vibration propagation axis. For optimum reflection of the normally incident vibrations, this dimension should be equal to an integral number of odd quarter wave lengths of the fundamental vibration in the reflector. Reflector 35 is preferably formed from metal, tungsten being particularly adapted for this purpose.

The use of reflector 35 in conjunction with the vibration generating means 24 produces displacement amplitudes in the fluid medium 18 that could not otherwise be realized by the generating means alone. However, to insure proper operation of the system, the fluid medium should extend between, and be in contact with output radiator 25 and surface 38 of reflector 35. Where the fluid medium is liquid, a thin air or vapor film in the treatment zone between the reflector 35 and output radiator 25 of only a few thousandths of an inch in depth can effectively decouple the system and prevent the operation thereof. In the embodiment of FIG. 1, the oil slick 18 may be impregnated with a chemical before reaching the device according to the invention to produce the desired unbroken continuity of the liquid medium. However, care must be taken to insure that the motion through the treatment zone is rectilinear, rather than curvilinear, since the latter motion produces forces which may in turn produce a stratified film of air in the treatment zone.

The foregoing arrangement serves to generate in the fluid medium 18 perturbations of large displacement amplitude which serve to develop disjunctive forces between the oil 20 bonded thereto. It has been found that these disjunctive forces are not the cavitational forces usually associated with conventional ultrasonic cleaning devices, but rather, principally those viscous forces generated due to proper use of the selective entrainment characteristics exhibited by particles in a periodically perturbating fluid medium. Said forces are developed by application of the method according to the invention described herein.

These viscous forces are produced and sustained by impressing high frequency vibrations on the fluid medium 18. The propagation of vibrations through the medium, of necessity, produces periodic perturbations of the fluid. The viscous forces generated are due to the relative motion that occurs between the oil and the water and are developed in the fluid boundary layers adjacent to the oil. These forces cause a momentum transfer from the fluid to the oil, thereby causing the oil to oscillate.

The viscous forces developed on the oil are periodic. However, at any given moment they are not uniformly distributed nor do they have the same magnitude. The oil particles are all individually subjected to viscous forces. The amplitude of these forces can vary widely and is a function of the kinematic constraints to which the oscillating oil particles are subject. To understand these constraints and the manner in which they determine the magnitude of the forces that are developed, the essential kinematics of this type of forced vibration are described below.

The motion of the oil oscillating in the medium is also periodic. For a viscous driving force, the displacement amplitude (maximum excursion) of any oil oscillating in the medium must always be less than the displacement amplitude of the medium itself. The quotient formed by expressing the displacement amplitude of any oil and the displacement amplitude of the fluid medium as a ratio is termed the entrainment ratio, said ratio being always numerically less than one.

The kinematic constraints that are essential to this process can be readily described by use of an idealized model. The model to be used will describe the motion produced if the oil is small spherical particles. In this situation, both the oscillations of the oil particles and the alternation of the periodic viscous forces acting on them occur at the same frequency as the impressed vibrations.

The homogenization of the oil 20 may be enhanced by introducing one or more chemical agents to act upon the oil to decrease its viscosity, or alter its characteristics in some manner to aid in the process. The homogenized solution after treatment by the ultrasonic means may be pumped a distance below the surface 22 before discharge thereof within the body of water 18. This may be done by a skimming pump on the vessel 14 or another vessel following behind the vessel 14.

To introduce the chemical agents, the equipment for spraying may be located on ship 12. The equipment includes a compressor 50 which applies spraying pressure to barrels 52, 54 through hoses 56.

Output hoses 58, 60 deliver separate streams 62, 64 of liquid through nozzles 65, 66 onto the oil slick 20. The streams 62, 64 combine with the oil slick 20 and form particles 68. The liquid components may be sprayed from separate ships or from one or more airplanes or helicopters. Aircraft can apply the liquid in a shorter period but cannot carry as large a reservoir as a ship. The choice of craft for carrying the spray equipment will depend on the extent of the slick and the facilities available for fueling and reloading the liquid.

The particles 68 are then processed in the treatment zone and thereafter the homogenized fluid exits into the body of water 18 and is absorbed therein. The invention is compatible with a wide variety of petroleum products either light or heavy viscosity and of aliphatic, aromatic, or nathenic character, such as fuel oil, parraffin oil, mineral oil, jetfuel, diesel fuel including marine, truck, and railroad diesels, heating fuels, and crude oils. The chemical agents in barrels 52 and 54 may be a treatment fluid for enhancing the micro-chopped oil particles to form a suspension. The treatment fluid may be water, reactive agent, etc.

Although an illustrative embodiment of the invention has been described in detail herein with reference to the accompanying drawings, it is to be understood that the invention is not limited to the precise embodiment and that various changes and modifications may be effected therein without departing from the scope or spirit of the invention.

I claim:

1. A method of removing an oil slick layer of material from a water surface comprising the steps of:
    A. vibrating a member having an output surface above the threshold range of the oil in a frequency range of 1,000 to 100,000 cycles per second, so as to provide peak accelerations of at least 50,000g,
    B. engaging said output surface of said vibrating member with the surface to transmit said vibrations to the oil, said vibrations having a substantial component of motion in a plane substantially parallel to the longitudinal axis of the member,
    C. micro-chopping said oil into fine particles by progressively moving said output surface relative to the oil slick layer, whereby the fine particles of oil are dispersed into the body of water and the oil slick is removed, and
    D. continuously supplying a treatment material to the surface adjacent said vibrating member to facilitate the uptake of the oil particles in the body of water.

2. A method as defined in claim 1, further including the step of controlling the depth of immersion of the member in the body of water during the relative movement between the oil slick and the member.

3. A method as defined in claim 1, wherein said output surface of said member is elliptically vibrated.

4. A method as defined in claim 1, wherein said output surface of said member is torsionally vibrated.

5. A method as defined in claim 1, wherein said output surface is vibrated with simultaneous longitudinal and torsional vibration.

6. A method as defined in claim 1, wherein said output surface is vibrated in the range of at least 100,000 to 150,000g.

7. A method as defined in claim 1, further including the step of continuously removing the micro-chopped oil from the surface after treatment.

8. A method as defined in claim 7, wherein said removal of oil is obtained by applying suction to the treated surface adjacent the output surface of the vibrating member.

9. A method of removing an oil slick layer of material from a water surface comprising the steps of:
    A. vibrating a member having an output surface above the threshold range of the oil in a frequency range of 1,000 to 100,000 cycles per second, so as to provide peak accelerations of at least 50,000g,
    B. engaging said output surface of said vibrating member with the surface to transmit said vibrations to the oil, said vibrations having a substantial component of motion in a plane substantially parallel to the longitudinal axis of the member;
    C. micro-chopping said oil into fine particles by progressively moving said output surface relative to the oil slick layer, whereby the fine particles of oil are dispersed into the body of water and the oil slick is removed,
    D. continuously removing the micro-chopped oil from the surface after treatment, by applying suction to the treated surface adjacent the output surface of the vibrating member, and
    E. said micro-chopped oil is removed by:
        a. supplying a treatment liquid to the treated surface so that contact of said output surface with the treated surface pressurizes the liquid for enhancing the effectiveness of the liquid in mixing with the micro-chopped oil and forming a suspension thereof; and
        b. simultaneously applying suction to said treated surface adjacent said member to remove said suspension from the surface.

10. A method as defined in claim 9, wherein the treatment liquid is supplied to the oil surface and the suction is applied to the oil surface at spaced apart locations between which at least a portion of the vibrated member is interposed so that the suction induces the treatment liquid to flow between said vibrated member and the oil surface for ensuring the continuous mixing and the removal of said suspension.

11. A method of removing an oil slick layer of material from a water surface comprising the steps of:
    A. vibrating a member having an output surface above the threshold range of the oil in a frequency range of 1,000 to 100,000 cycles per second, so as to provide peak accelerations of at least 50,000g,
    B. engaging said output surface of said vibrating member with the surface to transmit said vibrations to the oil, said vibrations having a substantial component of motion in a plane substantially parallel to the longitudinal axis of the member,
    C. micro-chopping said oil into fine particles by progressively moving said output surface relative to the oil slick layer, whereby the fine particles of oil are dispersed into the body of water and the oil slick is removed,
    D. disposing a reflecting surface beneath the oil slick,
    E. producing periodic perturbations in the oil slick by applying to the body of water said longitudinal vibrations of essentially plane wavefronts from the output surface propagated along an axis substantially normal to said reflecting surface, and
    F. reflecting said vibrations back into the body of water along an axis substantially normal to said reflecting surface so that said reflected vibrations are substantially in phase with said applied vibrations to increase the displacement amplitude of the output surface perturbations such that disjunctive micro-chopping forces produced for the release of oil particles from the oil slick into the water at least in part are due to the forces generated in said perturbating medium.

12. A method as defined in claim 11, and further including the step of selecting the frequency of said longitudinal vibrations dependent upon the density of the oil.

13. A method as defined in claim 11, wherein said longitudinal vibrations applied to said oil slick are of an intensity to produce essentially non-linear perturbations, thereby generating ponderomotive forces within said oil slick for the dislocation and displacement of said oil particles into the water.

14. A method as defined in claim 11, including continuously advancing said reflecting surface and said source of longitudinal vibrations to expose different portions of the oil slick.

15. A method as defined in claim 11, wherein said vibrations are applied to said reflecting surface substantially in phase with said applied vibrations to increase the displacement amplitude of the oil slick perturbations.

16. A method as defined in claim 11, further including the step of controlling the depth of immersion of the member in the body of water during the relative movement between the oil slick and the member.

17. A method of dispersing an oil slick on water which together form a liquid medium comprising the steps of:
   A. disposing a reflecting surface beneath the oil slick,
   B. producing periodic perturbations in the liquid medium by applying to the liquid medium longitudinal vibrations of essentially plane wavefronts propagated along an axis substantially normal to said reflecting surface,
   C. said longitudinal vibrations being applied to said liquid medium are of an intensity to produce essentially non-linear preturbations in the liquid medium, thereby generating ponderomotive forces within said liquid medium for the dislocation and displacement of the oil particles into the water by obtaining a micro-chopping of said oil slick into finite particles for absorption by the liquid medium,
   D. reflecting said vibrations back into said liquid medium along an axis substantially normal to said reflecting surface so that said reflected vibrations are substantially in phase with said applied vibrations to increase the displacement amplitude of the liquid medium perturbations such that disjunctive forces are produced for the release of oil particles form the oil slick into the water at least in part due to the forces generated in said perturbating medium, and
   E. continuously advancing said reflecting surface and said source of longitudinal vibrations to expose different portions of said liquid medium.

18. A method as defined in claim 17, and further including the step of selecting the frequency of said longitudinal vibrations dependent upon the density of the oil.

19. A method as defined in claim 17, further including the step of continuously removing the micro-chopped oil from the surface after treatment.

20. A method as defined in claim 19, wherein said removal of oil is obtained by applying suction to the treated surface adjacent the output surface of the vibrating member.

21. A method as defined in claim 17, and further including the step of vibrating the member in a frequency range of 1,000 to 100,000 cycles per second.

22. A method as defined in claim 17, and further including the step of controlling the depth of immersion of the member in the body of water during the relative movement between the oil slick and the member.

23. A method as defined in claim 17, wherein said output surface of said member is elliptically vibrated.

24. A method as defined in claim 17, wherein said output surface of said member is torsionally vibrated.

25. A method as defined in claim 17, wherein said output surface is vibrated with simultaneous longitudinal and torsional vibration.

26. A method as defined in claim 17, wherein said output surface is vibrated in the range of at least 100,000 to 150,000g.

27. A method for dispersing an oil slick on water which together form a liquid medium comprising:
   A. disposing a reflecting surface below the liquid medium,
   B. generating high-intensity longitudinal vibrations in a resonant mode,
   C. amplifying said longitudinal vibrations,
   D. producing periodic perturbations in said liquid medium by applying to said liquid medium said amplified longitudinal vibrations of essentially plane wavefronts along a propagation axis substantially normal to said reflecting surface the displacement amplitude of said liquid medium perturbations being such that disjunctive forces are produced for the release of oil particles from said oil slick into the body of water at least in part due to the forces generated in said perturbating medium,
   E. said vibrations are applied to said reflecting surface substantially in phase with said applied vibrations to increase the displacement amplitude of said fluid medium perturbations, and
   F. continuously removing the micro-chopped oil from the surface after treatment by applying suction to the treated surface adjacent the output surface of the vibrating member.

28. A method as defined in claim 27, and further including the step of vibrating the member in a frequency range of 1,000 to 100,000 cycles per second.

29. A method as defined in claim 27, further including the step of controlling the depth of immersion of the member in the body of water during the relative movement between the oil slick and the member.

30. A method as defined in claim 27, wherein said output surface of said member is elliptically vibrated.

31. A method as defined in claim 27, wherein said output surface of said member is torsionally vibrated.

32. A method as defined in claim 27, wherein said output surface is vibrated with simultaneous longitudinal and torsional vibration.

33. A method as defined in claim 27, wherein said output surface is vibrated in the range of at least 100,000 to 150,000g.

34. A system for dispersing an oil slick on the surface of water comprising:
   A. a craft for traversing the slick,
   B. a transducer having an output surface for engagement with the layer of oil of the water as it is moved relative thereto for producing vibrations,
   C. vibration generating means coupled to said transducer to effect vibration of the latter at a high frequency and with peak accelerations of at least 50,000g, so as to micro-chop said oil slick into particles as the vibrating surface is moved relative to the oil slick, wherein contact of said vibrated transducer pressurizes the oil for enhancing the effectiveness of the water in mixing with the micro-chopped oil particles and forming a suspension thereof,
   D. a reflecting surface mounted beneath the oil slick in spaced relationship to said transducer,
   E. said reflecting surface producing periodic perturbations in the oil slick by applying to the body of water said vibrations of essentially plane wavefronts from the output surface propagated along an axis substantially normal to said reflecting surface, wuch that said vibrations are reflected back into the body of water along an axis substantially normal to said reflecting surface so that said reflected vibrations are substantially in phase with said applied vibrations to increase the displacement amplitude of the output surface perturbations such that disjunctive micro-chopping forces produced for the release of oil particles from the oil slick into the water at least in part are due to the forces generated in said perturbating medium, and F. means operatively associated with said transducer for supplying a treatment fluid to the oil slick adjacent said transducer so that contact of said vibrated surface pressurizes the liquid for enhancing the effectiveness of the treatment fluid in mixing with the micro-chopped oil particles and forming a suspension thereof.

35. A system as defined in claim 34, and further including means operatively associated with said vibration generating means for effecting continuous removal of said suspension.

36. A system as defined in claim 34, wherein said treatment fluid is water.

37. A system as defined in claim 36, wherein said treatment fluid contains a reactive agent.

38. A system as defined in claim 34, wherein said transducer is mounted to extend beneath the craft.

39. A system as defined in claim 38, wherein said craft is adapted to be towed.

40. A system as defined in claim 38, and further including means for powering said craft.

* * * * *